United States Patent
Bauer et al.

(10) Patent No.: US 10,452,066 B2
(45) Date of Patent: Oct. 22, 2019

(54) METHOD AND DEVICE FOR TRANSFERRING A MOTOR VEHICLE FROM A MANUAL OPERATING MODE TO AN AUTOMATED OR ASSISTING OPERATING MODE

(71) Applicant: VOLKSWAGEN AG, Wolfsburg (DE)

(72) Inventors: Sascha Bauer, Berlin (DE); Sönke Freter, Berlin (DE); Stephan Max, Gifhorn (DE); Kristian Weiß, Berlin (DE)

(73) Assignee: VOLKSWAGEN AG (DE)

( * ) Notice: Subject to any disclaimer, the term of this patent is extended or adjusted under 35 U.S.C. 154(b) by 195 days.

(21) Appl. No.: 15/851,773

(22) Filed: Dec. 22, 2017

(65) Prior Publication Data

US 2018/0181123 A1   Jun. 28, 2018

(30) Foreign Application Priority Data

Dec. 22, 2016   (DE) .................. 10 2016 226 067

(51) Int. Cl.
*G05D 1/00* (2006.01)
*B62D 15/02* (2006.01)
(Continued)

(52) U.S. Cl.
CPC ....... *G05D 1/0061* (2013.01); *B62D 15/0265* (2013.01); *G05D 1/0212* (2013.01);
(Continued)

(58) Field of Classification Search
CPC ...... B60W 30/14; B60W 10/18; B60W 10/04; B60W 50/14; B60W 10/20; B60W 30/165;
(Continued)

(56) References Cited

U.S. PATENT DOCUMENTS

2016/0103449 A1    4/2016  Desnoyer et al.
2017/0106903 A1*   4/2017  Moretti .................. B62D 6/00
(Continued)

FOREIGN PATENT DOCUMENTS

DE    102009039084 A1    3/2011
DE    102010031672 A1    1/2012
(Continued)

OTHER PUBLICATIONS

Search Report for German Patent Application No. 10 2016 226 067.7, dated Sep. 20, 2017.

*Primary Examiner* — Behrang Badii
(74) *Attorney, Agent, or Firm* — Barnes & Thornburg LLP

(57) ABSTRACT

A method and an apparatus for transitioning a motor vehicle from a manual operating mode to an automated or assisting operating mode for driving along a saved trajectory including a memory, in which the trajectory and a tolerance region of the trajectory are saved; a mechanism for ascertaining the location of the motor vehicle relative to the saved trajectory; and a control unit, wherein the control unit is configured so that, if a predetermined criterion is met, a transition trajectory from a current instantaneous position to the saved trajectory is calculated and a steering torque is generated that steers the motor vehicle in the direction of the calculated transition trajectory, wherein the at least one criterion is a distance threshold value with respect to the saved trajectory, wherein the distance threshold value is selected so it is outside the tolerance region.

14 Claims, 2 Drawing Sheets

(51) Int. Cl.
*G05D 1/02* (2006.01)
*G08G 1/00* (2006.01)
*B60W 50/14* (2012.01)
*B60R 21/00* (2006.01)
*G08G 1/04* (2006.01)
*B60W 10/18* (2012.01)
*B60W 10/04* (2006.01)
*B60W 30/00* (2006.01)

(52) U.S. Cl.
CPC .............. *B60R 21/00* (2013.01); *B60W 10/04* (2013.01); *B60W 10/18* (2013.01); *B60W 30/00* (2013.01); *B60W 50/14* (2013.01); *G05D 1/02* (2013.01); *G05D 1/0272* (2013.01); *G05D 2201/0213* (2013.01); *G08G 1/00* (2013.01); *G08G 1/04* (2013.01); *G08G 1/22* (2013.01)

(58) Field of Classification Search
CPC ....... B60W 30/00; B62D 6/00; B62D 15/025; B62D 15/0285; B62D 5/0472; B62D 1/286; B62D 5/0463; B62D 1/28; B62D 21/11; B62D 15/0265; G05D 1/0272; G05D 1/0088; G05D 1/0061; G05D 1/0212; G05D 1/02; G05D 2201/0213; B60G 3/20; B60G 11/15; G08G 1/22; G08G 1/00; G08G 1/04; B60K 1/04; B60K 6/52; B60K 7/0007; B60K 17/356; F16D 27/02; F16D 27/06; B60L 50/61; B60L 50/16; B60R 21/00
See application file for complete search history.

(56) References Cited

U.S. PATENT DOCUMENTS

| | | | |
|---|---|---|---|
| 2017/0344023 A1* | 11/2017 | Laubinger | G05D 1/0272 |
| 2019/0054928 A1* | 2/2019 | Hatano | B60W 30/14 |
| 2019/0071075 A1* | 3/2019 | Mimura | B60R 21/00 |
| 2019/0106118 A1* | 4/2019 | Asakura | G08G 1/00 |

FOREIGN PATENT DOCUMENTS

| | | |
|---|---|---|
| DE | 102013201799 A1 | 8/2014 |
| DE | 102013017212 A1 | 4/2015 |
| DE | 102014220144 A1 | 4/2016 |
| DE | 102015200171 A1 | 7/2016 |
| DE | 102015001631 A1 | 8/2016 |
| WO | 2015039726 A1 | 3/2015 |

\* cited by examiner

METHOD AND DEVICE FOR TRANSFERRING A MOTOR VEHICLE FROM A MANUAL OPERATING MODE TO AN AUTOMATED OR ASSISTING OPERATING MODE

PRIORITY CLAIM

This patent application claims priority to German Patent Application No. 10 2016 226 067.7, filed 22 Dec. 2016, the disclosure of which is incorporated herein by reference in its entirety.

SUMMARY

Illustrative embodiments relate to a method and to an apparatus for transitioning a motor vehicle from a manual operating mode to an automated or assisting operating mode.

BRIEF DESCRIPTION OF THE DRAWINGS

Disclosed embodiments will be explained in more detail below with reference to the figures.

DETAILED DESCRIPTION

Figure 1:
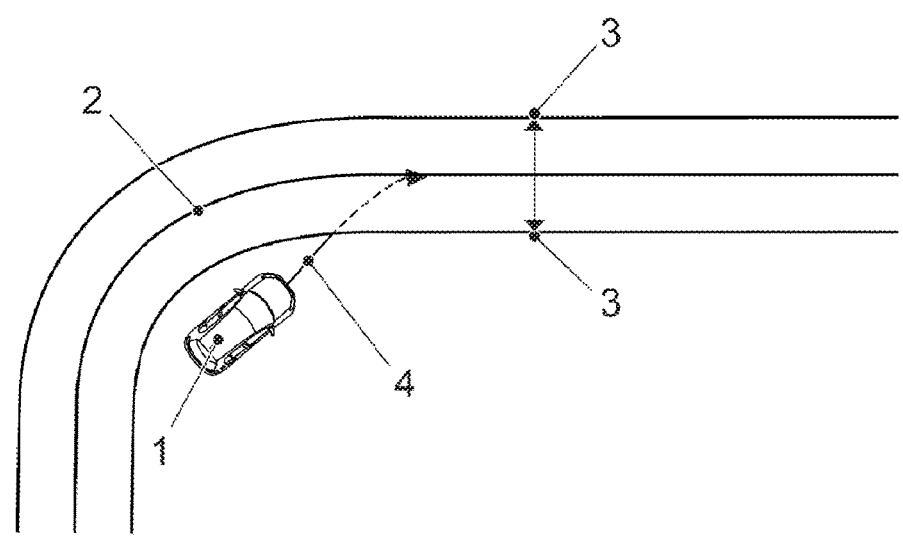
FIG. 1 shows an example of a situation for assisted driving onto a saved trajectory.

By way of example, in the function "trained parking," a driver can teach the vehicle a trajectory into a parking spot that is then stored in the vehicle. In later approaches, the vehicle can then drive along this trajectory in automated state. For localization purposes in the driving environment, environment features are captured via an environment sensor system (e.g., front camera) and saved in a digital localization map. For automated driving, the driver drives into the vicinity of the saved trajectory. The vehicle ascertains its location and the driver can transfer the task of driving to the vehicle. The trained parking spot can to this end already have been selected in the navigation at the start of the journey. The region within which the trained trajectory is permitted to be followed in automated state is limited for safety reasons. This limitation represents a tolerance region within which the vehicle must remain for driving to be effected in automated state. In addition, the possible lateral distance of the vehicle and its angular orientation with respect to the trajectory in which the vehicle can still ascertain its location in the digital map is limited by the sensor technology used. This is possible only in limited state if a front camera is used.

As already mentioned, the driver must guide his or her vehicle within the tolerance region around the trajectory so that it can be traveled in automated state. The position and the starting point of the trajectory are at times only inaccurately known to the driver, or sometimes not at all. Reasons herefor can be:

training of the trajectory into a parking spot was performed a while ago, training of the trajectory was performed by a different person or by technical devices, training was performed automatically by the vehicle, the starting point of the trajectory was not explicitly trained (e.g., if a fixed distance is trained repeatedly starting from the parking spot).

Possible visualization of the trajectory on a display unit distracts the driver and could be considered a disturbing influence by a practiced driver who knows where his or her trained trajectory begins.

DE 10 2013 201 799 A1 discloses a driver assistance system for a vehicle, comprising at least one sensor for producing a vehicle state signal and/or environment signal, and a calculation unit that records a route based on the vehicle state signal and/or environment signal. The calculation unit is furthermore configured to recognize a specific position of the vehicle by comparing the recorded route with a stored route and to offer a stored trajectory to the driver if the specific position has been recognized, wherein the driver assistance system is configured to control the vehicle for independent or semi-independent driving along the trajectory.

DE 10 2010 031 672 A1 discloses a method for assisting a driver of a vehicle in a driving maneuver, in which the vehicle is guided automatically along a previously calculated trajectory, or lateral guidance for driving along the trajectory is performed in automated state and control is returned to the driver after the driving maneuver is finished. Before and/or during the transfer of control to the driver, information relating to the environment of the vehicle and suitable steering settings are passed on to the driver.

Disclosed embodiments provide a method for transitioning a motor vehicle from a manual operating mode to an automated or assisting operating mode for driving along a stored trajectory. A further technical embodiment is the provision of a suitable apparatus.

The method for transitioning a motor vehicle from a manual operating mode to an automated or assisting operating mode for driving along a saved trajectory, wherein a tolerance region is saved with respect to the saved trajectory, includes, if at least one predefined criterion is fulfilled, the method operation of calculating a transition trajectory from a current instantaneous position to the saved trajectory and of generating a steering torque that steers the motor vehicle in the direction of the calculated transition trajectory, wherein the at least one criterion is a distance threshold value with respect to the saved trajectory, wherein the distance threshold value is selected such that it is outside the tolerance region. Consequently, the driver is guided in an assisted state into the tolerance region, after which the vehicle drives in automated or assisted state along the trajectory, depending on the embodiment. During the assisted driving, it is possible for only the lateral guidance to be automated, or for only steering torques to be produced, so as to make departing from the tolerance region more difficult. The transition to automated driving upon reaching the tolerance region can here be either performed in automated state or take place after confirmation by the driver. If the tolerance region is located symmetrically about the trajectory, the distance threshold value is at least greater than half the tolerance region. However, the distance threshold value should not be selected to be too large either, since otherwise the steering torque can cause irritation. A possible distance threshold value is 20 m, for example.

In at least one disclosed embodiment, if a plurality of trajectories are saved, the trajectory that best meets the criterion or the criteria or that was chosen in advance is selected. In the case of a plurality of criteria, these may be weighted.

In a further disclosed embodiment, the calculation of the transition trajectory is performed based on the vehicle speed and/or the lateral distance. In this case, for greater vehicle speeds or greater lateral distance, a longer transition trajectory is calculated so as to be able to limit the magnitude of the steering torque.

In a further disclosed embodiment, a longitudinal controller is additionally adapted. To this end, for example, the setting rate of an ACC controller or vehicle speed controller is set such that the following automated drive along the trajectory is reliably and comfortably made possible by the parking controller or by a different controller for automated driving. If normatively a stop is required for the transition between assisted driving along the trajectory and automated driving along the trajectory, the stop can likewise be performed in automated state once the saved trajectory has been reached.

In a further disclosed embodiment, the calculated transition trajectory for newly captured obstacles is dynamically adapted so as to take into consideration obstacles that have not previously been captured.

In a further disclosed embodiment, the method is interrupted if a hand torque acting against the generated steering torque is greater than a threshold value, i.e., the driver can interrupt the assisted driving onto the trajectory at any time.

The apparatus for transitioning a motor vehicle from a manual operating mode to an automated or assisting operating mode for driving along a saved trajectory comprises a memory, in which the trajectory and the tolerance region of the trajectory are saved. The apparatus furthermore comprises a mechanism for ascertaining the location of the motor vehicle relative to the saved trajectory and a control unit, wherein the control unit is configured such that, if a predetermined criterion is met, a transition trajectory from a current instantaneous position to the saved trajectory is calculated and a steering torque is generated that steers the motor vehicle in the direction of the calculated transition trajectory, wherein the at least one criterion is a distance threshold value with respect to the saved trajectory, wherein the distance threshold value is selected such that it is outside the tolerance region.

With respect to further configurations of the apparatus, reference is made to the previous embodiments relating to the method.

FIG. 1 illustrates a situation of a motor vehicle 1 that is in manual operating mode. The motor vehicle 1 is located at a lateral distance from a saved trajectory 2, wherein a tolerance region 3 about the trajectory 2 is illustrated. Furthermore illustrated is a calculated trajectory 4 by which the motor vehicle 1 can be guided into the tolerance region 3, wherein the dashed profile describes the trajectory leading to the saved trajectory 2. The size of the tolerance region 3 is indicated by the double-headed arrow.

Figure 2:
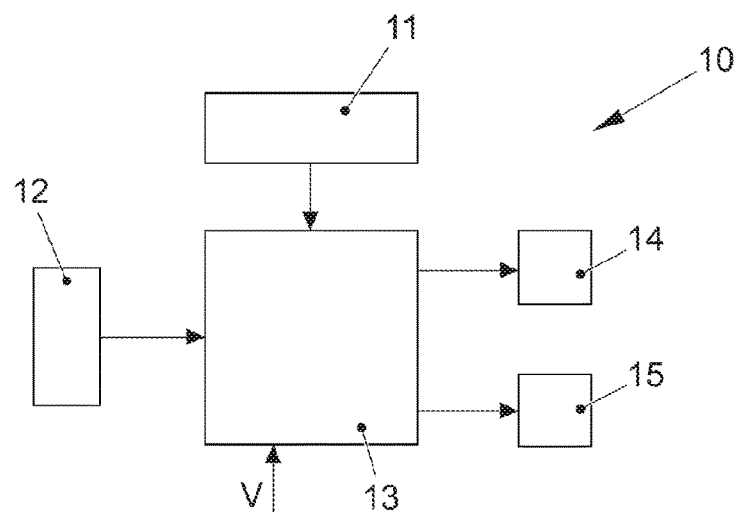
FIG. 2 shows a schematic diagram of an apparatus for transitioning a motor vehicle from a manual operating mode to an automated or assisting operating mode.

The apparatus 10 for transitioning the motor vehicle 1 from a manual operating mode into an automated or assisting operating mode in the tolerance region 3 is illustrated in FIG. 2. The apparatus 10 comprises a memory 11, in which the trajectory 2 and the tolerance region 3 are saved. The apparatus 10 furthermore comprises a mechanism 12 for ascertaining the location of the motor vehicle 1 relative to the at least one saved trajectory 2 and at least one control unit 13. The control unit 13 receives the data from the mechanism 12 and can read the memory 11. The control unit 13 furthermore receives further vehicle data, in particular, the vehicle speed V. The control unit 13 can calculate a transition trajectory 4 to the tolerance region 3 and calculate control signals for a lateral controller 14 and a longitudinal controller 15.

Figure 3:
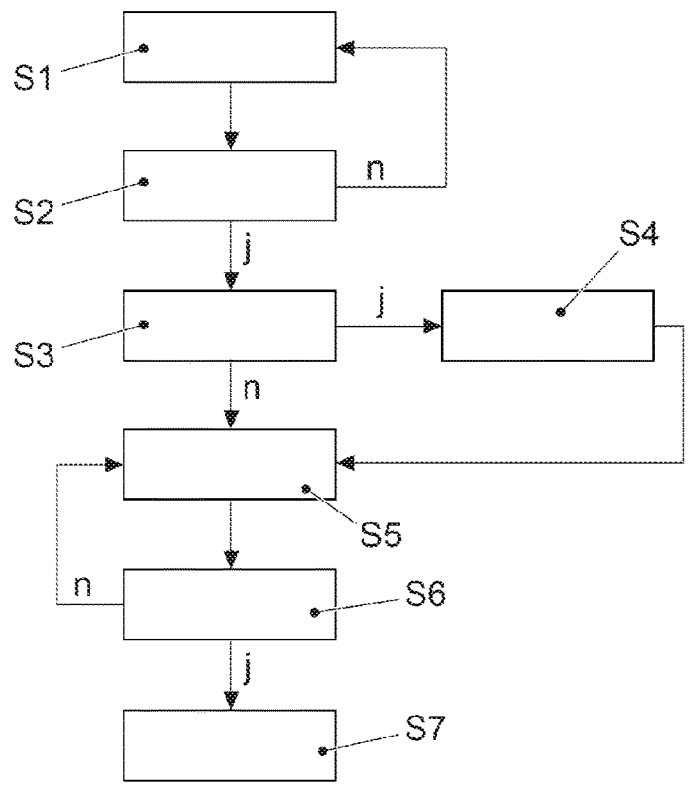
FIG. 3 shows a schematic flowchart of a method for transitioning a motor vehicle from a manual operating mode to an automated or assisting operating mode.

The function of the apparatus 10 will now be explained on the basis of FIG. 3. In a first operation at S1, the motor vehicle 1 ascertains its location relative to the saved trajectories 2 using the mechanism 12. Localization can be performed here using GPS and/or landmarks. For activating the assisted transition from the manual operating mode to the automated operating mode, the following criteria are checked in operation at S2 for the found trajectories 2, with only the first criterion being mandatory:

distance from the first or nearest trajectory point is less than a distance threshold value, the driving direction of the vehicle matches the possible driving directions of the trajectory, the trajectory is located in the vehicle's own lane, the lateral distance from and the alignment with the trajectory is sufficiently small, i.e., the angle between the vehicle's longitudinal axis and its trajectory is considerably less than 90°.

In a next operation at S3, a check is performed as to whether a plurality of trajectories 2 meet the criteria. If this is the case, a determination is performed in operation at S4 as to which trajectory 2 best fulfills the criteria or whether the driver has already manually made a prior selection.

If, on the other hand, only one trajectory 2 fulfills the criteria, it is used for the further processing in operation at S5. In this operation at S5, the control unit 13 determines the nearest point on the selected trajectory 2 and the alignment of the trajectory 2 with respect to the vehicle alignment. A transition trajectory 4 to this point is calculated, wherein the maximum curvature is influenced by the lateral distance from the trajectory and the vehicle speed. If the lateral offset is large, the curvature becomes smaller and thus the length of the transition trajectory 4 becomes longer. Accordingly, at greater speeds, the curvature is selected to be smaller and the transition trajectory 4 becomes correspondingly longer. The control unit 13 then produces a steering torque in the direction of the calculated transition trajectory 4 which the driver feels in the handling of the steering. Unless the driver overrides this driving torque, the motor vehicle is guided in the direction of the trajectory 2. In addition, the longitudinal guidance can be adapted. A check is performed in operation at S6 as to whether the tolerance region 3 has been reached. If this is not the case, the method is continued. However, if this is the case, then a switch takes place in S7 in automated state or upon manual activation to the automated operating mode, and the driver can take the hands of the steering wheel, for example, whereupon the motor vehicle drives along the trajectory in automated state.

The method permits comfortable transition from manual to automated driving on trained trajectories or trajectories that have been otherwise provided. The automated driving along the trajectory is also improved, because the vehicle can be aligned optimally with respect to the trajectory even upon entry. The function can be easily implemented, because it operates similarly to a lane assist system.

The invention claimed is:

1. A method for transitioning a motor vehicle from a manual operating mode to an automated or assisting operating mode for driving along a saved travel trajectory, the method comprising:

in response to at least one predefined criterion being fulfilled, a transition trajectory from a current instantaneous position to a saved trajectory is calculated and a steering torque is generated that steers the motor vehicle in a direction of the calculated transition trajectory, wherein a tolerance region is saved for the saved trajectory, wherein the at least one criterion is a distance threshold value with respect to the saved trajectory, and wherein the distance threshold value is selected so it is outside the tolerance region.

2. The method of claim 1, wherein a further criterion for calculating the transition trajectory is that the driving direction of the motor vehicle matches the possible driving directions of the saved trajectory and/or the saved trajectory is located in a current lane and/or the lateral distance from and the alignment with the saved trajectory is such that an angle between the vehicle's longitudinal axis and its trajectory is less than 90°.

3. The method of claim 1, wherein a plurality of trajectories are saved and the method further comprises selecting a trajectory that best meets the criterion or the criteria or that was chosen in advance.

4. The method of claim 1, wherein the calculation of the transition trajectory is performed based on the vehicle speed and/or the lateral distance.

5. The method of claim 1, further comprising adapting a longitudinal controller by setting a setting rate of the longitudinal controller such that following an automated drive along the trajectory is performed.

6. The method of claim 1, further comprising dynamically adapting the calculated transition trajectory in response to detection of obstacles.

7. The method of claim 1, further comprising interrupting the method in response to a determination that a hand torque acting against the generated steering torque is greater than a threshold value.

8. An apparatus for transitioning a motor vehicle from a manual operating mode to an automated or assisting operating mode for driving along a saved trajectory, the apparatus comprising:

a memory, in which the trajectory and a tolerance region of the trajectory are saved;

a mechanism for ascertaining the location of the motor vehicle relative to the saved trajectory; and a control unit configured to, in response to a predetermined criterion being met, calculate a transition trajectory from a current instantaneous position to the saved trajectory and generate steering torque that steers the motor vehicle in a direction of the calculated transition trajectory, wherein the at least one criterion is a distance threshold value with respect to the saved trajectory, and wherein the distance threshold value is selected so it is outside the tolerance region.

9. The apparatus of claim 8, wherein a further criterion for calculating the transition trajectory is that the driving direction of the motor vehicle matches the possible driving directions of the saved trajectory and/or the saved trajectory is located in a current lane and/or the lateral distance from and the alignment with the saved trajectory is such that an angle between the vehicle's longitudinal axis and its trajectory is less than 90°.

10. The apparatus of claim 8, wherein a plurality of trajectories are saved and the method further comprises selecting a trajectory that best meets the criterion or the criteria or that was chosen in advance.

11. The apparatus of claim 8, wherein the calculation of the transition trajectory is performed based on the vehicle speed and/or the lateral distance.

12. The apparatus of claim 8, further comprising a longitudinal controller that is adapted by setting a setting rate of the longitudinal controller such that following an automated drive along the trajectory is performed.

13. The apparatus of claim 8, wherein the calculated transition trajectory is dynamically adapted in response to detection of obstacles.

14. The apparatus of claim 8, wherein operation of the apparatus is interrupted in response to a determination that a hand torque acting against the generated steering torque is greater than a threshold value.

* * * * *